COUNTER FOR MAGNETIC TAPE RECORDING AND/OR REPRODUCING APPARATUS
Filed Dec. 4, 1963
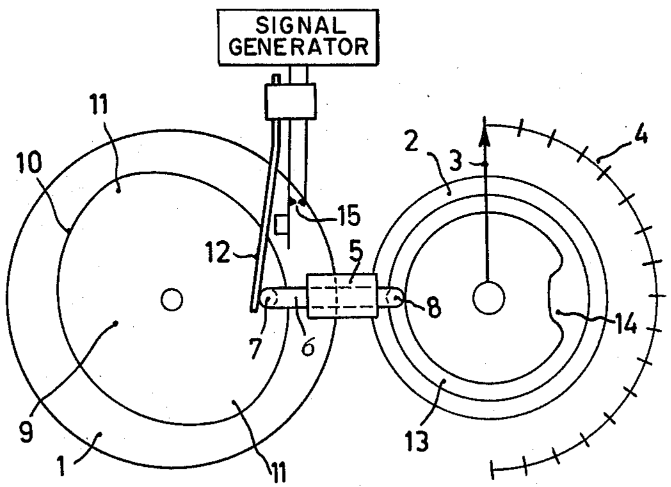
FIG.1
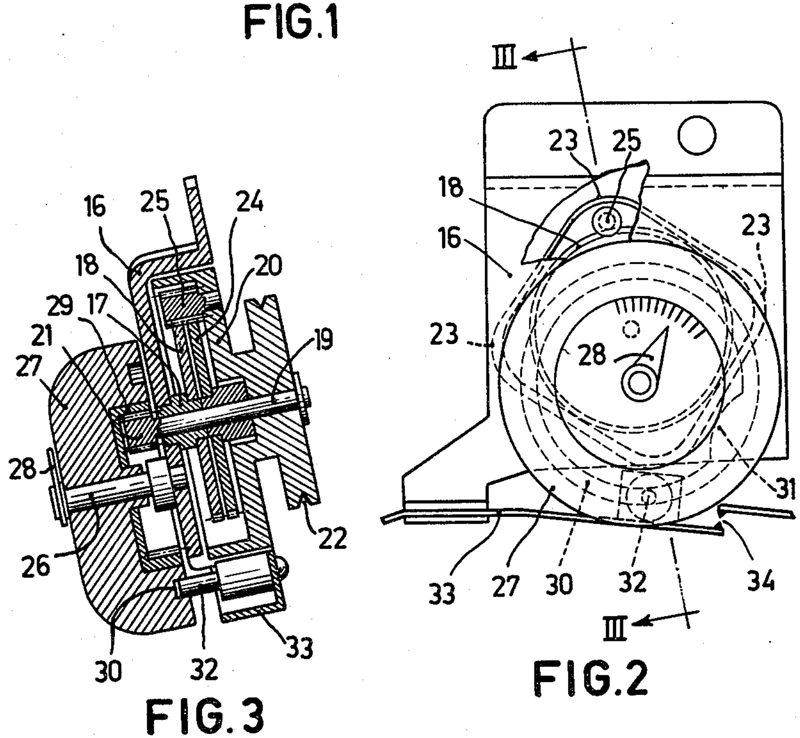
FIG.3
FIG.2
INVENTORS
Karl Rupp &
Lothar Jager
BY
Frank R. Trifari
AGENT

United States Patent Office 3,207,432 Patented Sept. 21, 1965

3,207,432

COUNTER FOR MAGNETIC TAPE RECORDING AND/OR REPRODUCING APPARATUS

Karl Rupp and Lothar Jäger, Vienna, Austria, assignors to North American Philips Company, Inc., New York, N.Y., a corporation of Delaware Filed Dec. 4, 1963, Ser. No. 327,908
Claims priority, application Austria, Dec. 13, 1962, A 9,734/62
7 Claims. (Cl. 235—128)

The invention relates to a counting device for use in a recording and/or reproducing apparatus having a magnetizable wire- or tape-shaped record carrier; said device being provided with indicating means and also adapted to produce a signal after the passage of a given amount or length of the record carrier.

The length of tape passed, or to be passed, can be measured in length or in minutes of transit time by an appropriate indicating means.

In accordance with this invention a simple counting device is provided with a pin or the like which operates the circuit contact of a signal generator and is driven by the driving wheel of the counting device to produce an intermittent signal. This pin is held in an inoperative position by the driven tape measuring wheel until the visual and/or audible signal is desired as chosen beforehand or at the end of the tape.

As compared with known counting devices the apparatus according to the invention has the particular advantage that the predetermined length of passed record carrier is indicated by the production of an intermittent visible and/or audible signal, which is much more conspicuous than a continuous signal, while the parts already provided in the device for indicating purposes requires the addition of only a simple part to operate a circuit contact. Thus by simplest means the most effective signal is obtained as economically as possible.

A particular advantageous embodiment of a counting device according to the invention comprises a planetary reduction gear train including the driven wheel and counting wheel.

A primary object of the invention is to provide a compact counter for a magnetic tape recorder/reproducer which is economically manufactured and assembled.

Another object of the invention is to provide a novel counter for magnetic tape recorders/reproducers which also provides an audible and/or visual intermittent signal.

The foregoing objects and advantages together with additional objects and advantages will be apparent from the following description of the drawing illustrating presently preferred embodiments of the invention and in which:

FIG. 1 shows an embodiment of a counting device according to the invention in a diagrammatic plan view.

FIGS. 2 and 3 show a counting device comprising a planetary gear drive. FIG. 2 is a plan view and FIG. 3 is a sectional view taken on the line II—II in FIG. 2.

In the device shown in FIG. 1 a driven wheel 1 drives a second wheel 2 via a transmission gear (not shown in FIG. 1) having a large transmission ratio. Wheel 2 is connected with a pointer 3, which moves over a scale 4. The wheel 1 may be driven in any suitable manner, for instance, by means of a belt and pulley from a shaft of the apparatus, which rotates with the record carrier, for example the shaft of the supply spool. Any suitable means (not shown in FIG. 1) is provided for relatively adjusting wheel 1 and 2 so that during travel of the tape the pointer moves from beginning to end of the scale. The wheel 1 of course performs many revolutions. The two wheels 1 and 2 are interconnected not only via a reduction drive transmission but also through a pin 6, adapted to move in a bearing 5. The ends 7 and 8 of said pin are operatively connected with the wheels; for this purpose said ends are bent over towards the wheels. The end 7 of the pin engages with a depression 9 of wheel 1, the lateral boundary 10 of which constitutes a guide path provided with camlike rounded recesses 11. The end 7 of the pin is urged by a spring 12 toward the surface 10. The other end 8 of the pin is accommodated in a groove 13 of the wheel 2 which holds end 7 away from surface 10. A rounded radial inward recess 14 constitutes an interruption of said groove 13, so that a radial displacement of the end 8 of the pin and hence a lateral displacement of the whole pin is possible. Thus only when the end 8 of the pin is located in said recess 14 can spring 12 urge the end 7 of the pin against the guide surface 10, so that the pin 5 and hence the spring 12 can perform the movements determined by the guide path 10. The reciprocating movements of the spring 12 thus determined serve for intermittent actuation of a contact 15, which is included in the current circuit of a signal generator, which produces for example an optical or acoustical signal. Since the wheel 2 rotates very slowly and the wheel 1 rotates very rapidly, successive signals are produced during the time the end 8 of the pin is located in the recess 14. The recess 14 can be readily positioned in any suitable known manner so that the signals are produced when the pointer arrives at the end of the scale and thus indicates the end of the tape.

As a matter of course, numerous variations may be applied to the shape of the guide paths 10 and 13 of the two wheels. It is only essential that the guide path 13 of the slowly rotating wheel 2, in which the pin is immovable, should have a recess or interruption 14 to free the pin so that the guide path of the rapidly rotating wheel 1 is rendered operative, and the pin performs a reciprocating movement. The order of succession of the signals in time can be varied by means of the speed of rotation of the wheel 1 within wide limits or by means of the number of recesses 11 of the guide path 10 thereof.

In the embodiment shown in FIGS. 2 and 3 the reduction drive transmission is in the form of a planetary gear drive. This drive is supported on bracket 16 to which a bearing sleeve 17 is fastened. A gear wheel 18 is pressed onto sleeve 17. The sleeve 17 rotatably supports the shaft 19. The input wheel 20 is adapted to rotate relative to said shaft 19 at one end thereof. The other end of the shaft 19 has fixed thereto a toothed pinion 21. By means of the groove or pulley 22 the input wheel 20 is driven via a belt from a shaft rotating at the speed of the tape. The periphery of the wheel 20 is shaped to form four humps or cams 23 (comparable to recesses 11, FIG. 1). The shaft 19 is furthermore provided with a gear wheel 24, which drives the shaft 19 and comprises one tooth more than the fixed gear wheel 18. A toothed pinion or sun gear 25 rotatably secured on the input wheel 20 interconnects the two gear wheels 18 and 24, so that the speed of rotation of the output pinion 21 relative to the speed of rotation of the input wheel 20 is greatly reduced.

A gudgeon 26 secured on bracket 16 constitutes the bearing for a disc-shaped scale 27, which is rotatable behind a pointer 28, rigidly secured to the gudgeon 26. The scale 27 is driven by a hollow cylinder 29, provided with internal gear teeth engaged by the pinion 21. Thus a direct transmission is obtained between the shaft 19 and the output wheel or scale 27. The hollow cylinder 29 is held in the scale 27 by friction so that a slip clutch is formed, i.e., the scale 27 is moved along by the hollow cylinder 29 with certainty; however, the scale 27 can be turned with respect to the hollow cylinder 29 for ready adjustment of the zero point.

On the rear side of scale 27 a circular groove 30 (similar to groove 13, FIG. 1), is provided which is interrupted at one place by a widened part or recess 31 (similar to recess 14 FIG. 1). The groove 30 guides or holds the pin 32 against movement by a leaf spring 33. The leaf spring is tensioned so that it holds the pin 32 on the outer surface of the wheel 20 as soon as the end of the pin 32 moves into or resides in the interruption 31 of the groove 30. The movement of the spring 33 thus intermittently opens and closes a contact 34 included in the current circuit of a signal generator.

What is claimed is:

1. A counter for a magnetic tape recorder/reproducer comprising a reduction gear train means including a driven input wheel and an output wheel means including a pointer and associated scale, a signal generator having an electric circuit including a circuit switch, movable control means connected with said output wheel means, said control means being movable between an operative position closing said switch and an inoperative position opening said switch by said output wheel means, said control means being connected with said input wheel in said operative position and disconnected therefrom in said inoperative position, and means connected with said input wheel for intermittently driving said control means in said operative position for successively opening and closing said electric circuit.

2. A counter for a magnetic tape recorder/reproducer comprising a reduction gear train means including a driven input wheel having a surface including at least one eccentric portion and an output wheel means including a pointer and associated scale, said output wheel means having a concentric portion and a coextensive eccentric portion, a signal generator having an electric circuit including a circuit switch, control means connected with said output wheel means, said control means being held in an inoperative position by said concentric portion and released to an operative position by said eccentric portion of said output wheel means, a spring moving said control means into engagement with said input wheel surface when released by said output wheel means, said input wheel surface and said spring driving said control means for intermittently opening and closing said circuit.

3. A counter for a magnetic tape recorder/reproducer comprising a first wheel driven at a speed proportional to the velocity of the tape, a second wheel, said second wheel being driven by said first wheel through a planetary reduction means interconnecting said first and second wheel, said first wheel having an eccentric cam surface, said second wheel having a concentric cam surface and a coextensive enlarged eccentric cam surface, a slideably supported control member operatively connected with the said cam surface of said second wheel, said concentric cam surface maintaining said control member in a first position and said coextensive enlarged eccentric cam surface releasing said control member from said first position, means moving said control member into a second position engaging the eccentric cam surface of said first wheel, and said eccentric cam surface intermittently moving said control member between said first and second positions.

4. A counter for a magnetic tape recorder/reproducer according to claim 3 wherein the eccentric cam associated with said first wheel comprises an axial depression in said wheel defining an interior surface having rounded radially outwardly extending recesses.

5. A counter for a magnetic tape recorder/reproducer according to claim 3 wherein the eccentric cam associated with said first wheel comprises at least one radially extending rounded protrusion at the periphery of said first wheel.

6. A counter for a magnetic tape recorder/reproducer according to claim 3 wherein said cam surfaces of said second wheel comprises an annular groove concentric with the axis of rotation of said second wheel having an enlargement oriented toward said axis.

7. A counter for a magnetic tape recorder/reproducer according to claim 6 wherein said planetary reduction means includes a driven pinion, said second wheel comprises an indicating disc having a centrally located recess concentrically within said cam surfaces, a hollow cylinder receivable within said recess and defining a slip clutch with said disc, said cylinder having internal gear teeth engaging the driven pinion of said planetary reduction means.

References Cited by the Examiner

UNITED STATES PATENTS

| | | | |
|---|---|---|---|
| 629,792 | 8/99 | Kessinger et al. | 307—132 |
| 2,124,045 | 7/38 | Swensen | 200—30 |

LEO SMILOW, *Primary Examiner.*